(12) United States Patent
Takahashi et al.

(10) Patent No.: US 12,547,749 B2
(45) Date of Patent: Feb. 10, 2026

(54) SECURE SEARCH METHOD, SYSTEM THEREOF, APPARATUS THEREOF, ENCRYPTION APPARATUS, SEARCHER TERMINAL, AND PROGRAM

(71) Applicant: NTT, Inc., Tokyo (JP)

(72) Inventors: Satoshi Takahashi, Musashino (JP); Koji Chida, Musashino (JP); Koki Hamada, Musashino (JP); Atsunori Ichikawa, Musashino (JP)

(73) Assignee: NTT, Inc., Tokyo (JP)

( * ) Notice: Subject to any disclaimer, the term of this patent is extended or adjusted under 35 U.S.C. 154(b) by 158 days.

(21) Appl. No.: 18/283,005

(22) PCT Filed: Mar. 22, 2021

(86) PCT No.: PCT/JP2021/011663
§ 371 (c)(1),
(2) Date: Sep. 20, 2023

(87) PCT Pub. No.: WO2022/201234
PCT Pub. Date: Sep. 29, 2022

(65) Prior Publication Data
US 2024/0176903 A1    May 30, 2024

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01); *G06F 21/606* (2013.01)

(58) Field of Classification Search
CPC .. G06F 21/6218; G06F 21/602; G06F 21/606; G06F 21/6227; G06F 21/6245; H04L 2209/46; H04L 9/085; H04L 9/008
See application file for complete search history.

(56) References Cited

U.S. PATENT DOCUMENTS 10,693,626 B2 *   6/2020   Ren .................. H04L 9/008
11,128,452 B2 *   9/2021   Vaněk ............... H04L 9/3066
(Continued)

FOREIGN PATENT DOCUMENTS

JP      2016-012111 A      1/2016
JP      2016-071639 A      5/2016
(Continued)

*Primary Examiner* — Joseph P Hirl
*Assistant Examiner* — Aayush Aryal
(74) *Attorney, Agent, or Firm* — XSENSUS LLP (57) ABSTRACT

Data search by secure computation is efficiently performed and retrieved data is safely provided. A searcher terminal acquires condition data. The searcher terminal extracts a feature from the condition data. The searcher terminal encrypts the feature of the condition data. A secure search apparatus acquires a search result indicating a ciphertext of target data corresponding to a feature of target data similar to the feature of the condition data while keeping the feature of the target data and the feature of the condition data secret. The secure search apparatus transmits the search result to an encryption apparatus and the searcher terminal. The searcher terminal acquires the ciphertext of the target data indicated by the search result. The encryption apparatus transmits a decryption key to the searcher terminal. The searcher terminal decrypts the ciphertext of the target data using the decryption key.

7 Claims, 7 Drawing Sheets

(56) References Cited

U.S. PATENT DOCUMENTS

| | | | |
|---|---|---|---|
| 11,764,940 B2* | 9/2023 | Shainski | G06F 21/6227 |
| 11,790,106 B1* | 10/2023 | Stapleton | G06F 21/64 |
| 11,816,212 B2* | 11/2023 | Hoang | G06F 21/567 |
| 12,107,965 B2* | 10/2024 | Bernsen | H04L 9/0643 |
| 2013/0318351 A1* | 11/2013 | Hirano | H04L 9/3231 |
| | | | 713/168 |
| 2014/0298009 A1* | 10/2014 | Hattori | H04L 9/3073 |
| | | | 713/155 |
| 2015/0046450 A1* | 2/2015 | Yoshino | G06F 16/7837 |
| | | | 707/736 |
| 2015/0381348 A1 | 12/2015 | Takenaka et al. | |
| 2016/0294553 A1* | 10/2016 | Hattori | H04L 63/06 |
| 2016/0350552 A1* | 12/2016 | Matsuzaki | G06F 16/9535 |
| 2017/0099263 A1* | 4/2017 | Matsuzaki | H04L 67/12 |
| 2017/0169241 A1* | 6/2017 | Unagami | G09C 1/00 |
| 2018/0241558 A1* | 8/2018 | Takahashi | H04L 9/3231 |
| 2019/0036679 A1* | 1/2019 | Hirano | G09C 1/00 |
| 2019/0213308 A1* | 7/2019 | Fukuda | G06V 40/50 |
| 2019/0229906 A1* | 7/2019 | Jin | H04L 9/14 |
| 2019/0260583 A1* | 8/2019 | Kawai | G06F 21/6209 |
| 2020/0412536 A1* | 12/2020 | Hirano | H04L 9/30 |
| 2022/0311621 A1* | 9/2022 | Uchida | H04L 9/008 |

FOREIGN PATENT DOCUMENTS

| | | | | |
|---|---|---|---|---|
| JP | 2017111793 A | * | 6/2017 | |
| JP | 2017-175244 A | | 9/2017 | |
| WO | WO-2016203555 A1 | * | 12/2016 | G06F 16/00 |

* cited by examiner

SECURE SEARCH METHOD, SYSTEM THEREOF, APPARATUS THEREOF, ENCRYPTION APPARATUS, SEARCHER TERMINAL, AND PROGRAM

CROSS-REFERENCE TO RELATED APPLICATION

The present application is based on PCT filing PCT/JP2021/011663, filed Mar. 22, 2021, the entire contents of which are incorporated herein by reference.

TECHNICAL FIELD

The present invention relates to a secure computation technology, and more particularly, to a technology for searching data similar to search condition data while keeping search target data secret.

BACKGROUND ART

In recent years, surveillance cameras and Internet of Things (IOT) technologies have become widespread, and a large amount of private data such as surveillance camera videos are accumulated. By applying an image search technology, it is possible to extract image data similar to image data input as a search condition from the accumulated surveillance camera videos. Such a technology is expected to be utilized in various fields such as access and exit management to and from facilities and information provision to an investigative agency when an incident or an accident occurs. However, the image data to be searched is the record of personal life, and needs to be appropriately managed so that leakage of private data does not occur.

Assuming the usage as described above, it is natural to apply a secure computation technology as a search technology while securing confidentiality of data. Patent Literature 1 discloses a technology in which features of a visitor extracted from a surveillance camera video or the like is kept secret by secret sharing or the like, and the secrecy information is searched to verify a visitor.

PRIOR ART LITERATURE

Patent Literature

Patent Literature 1: JP 2016-71639 A

SUMMARY OF THE INVENTION

Problems to be Solved by the Invention

However, in case a secure computation technology is applied, it takes enormous computation cost to directly input image data and perform search by secure computation, which is not realistic. In addition, the conventional technology disclosed in Patent Literature 1 only outputs a collation result, and cannot safely provide original image data to a user.

In view of the above technical problems, an objective of the present invention is to efficiently perform data search by secure computation and to safely provide retrieved data.

Means to Solve the Problems

A secure search method according to an aspect of the present invention is a secure search method performed by a secure search system including at least one secure search apparatus, an encryption apparatus, and a searcher terminal, the secure search method including: encrypting a target feature extracted from target data that is a search target by a target feature encryption unit of the encryption apparatus; encrypting the target data by a target data encryption unit of the encryption apparatus; encrypting a condition feature extracted from condition data that is a search condition, by a condition feature encryption unit of the searcher terminal; acquiring a search result indicating a ciphertext of target data corresponding to a target feature similar to the condition feature while keeping the target feature and the condition feature secret using a ciphertext of the target feature and a ciphertext of the condition feature, by a feature search unit of a secure search apparatus; and decrypting the ciphertext of the target data indicated by a search result to acquire original target data by an encrypted data decryption unit of the searcher terminal.

Effects of the Invention

According to the present invention, it is possible to efficiently perform data search by secure computation and to safely provide retrieved data.

DETAILED DESCRIPTION OF THE EMBODIMENTS

The present invention applies a secure computation technology to implement a secure search system for sensitive data. In order to efficiently perform search even when secure computation of a large computation cost is used, a feature is extracted from original data in advance outside of the search system (for example, when the original data as the search target is the surveillance camera video, at the surveillance camera itself or at an intermediate server installed between the surveillance camera and the search system), and the feature and the original data are encrypted and registered in the search system. The search system performs data search by secure computation using only ciphertext (s) of the feature. Based on the result of the data search, the search system provides search result (s) indicating the ciphertext of the original data separately stored to a searcher who has performed the search. The searcher decrypts the ciphertext of the original data obtained as the search result to obtain the original data.

Hereinafter, an embodiment of the present invention will be described in detail. In the drawings, constituents having the same functions are denoted by the same reference numerals, and redundant description will be omitted.

EMBODIMENT

An embodiment of the present invention is secure search system and method for searching, from the stored search target data, the data similar to data input as a search condition by secure computation keeping each data secret. In the present embodiment, such a usage is assumed as image data included in surveillance camera videos captured by a surveillance camera is a search target, image data in which a specific person appears is a search condition, and, from the stored search target image data, image data in which a person appearing in the image data of the search condition is included is output as a search result. However, the data to be searched in the present invention is not limited to image data. Any type of data can be a search target as long as it is data from which certain feature can be extracted, such as voice data and text data for example.

Figure 1:
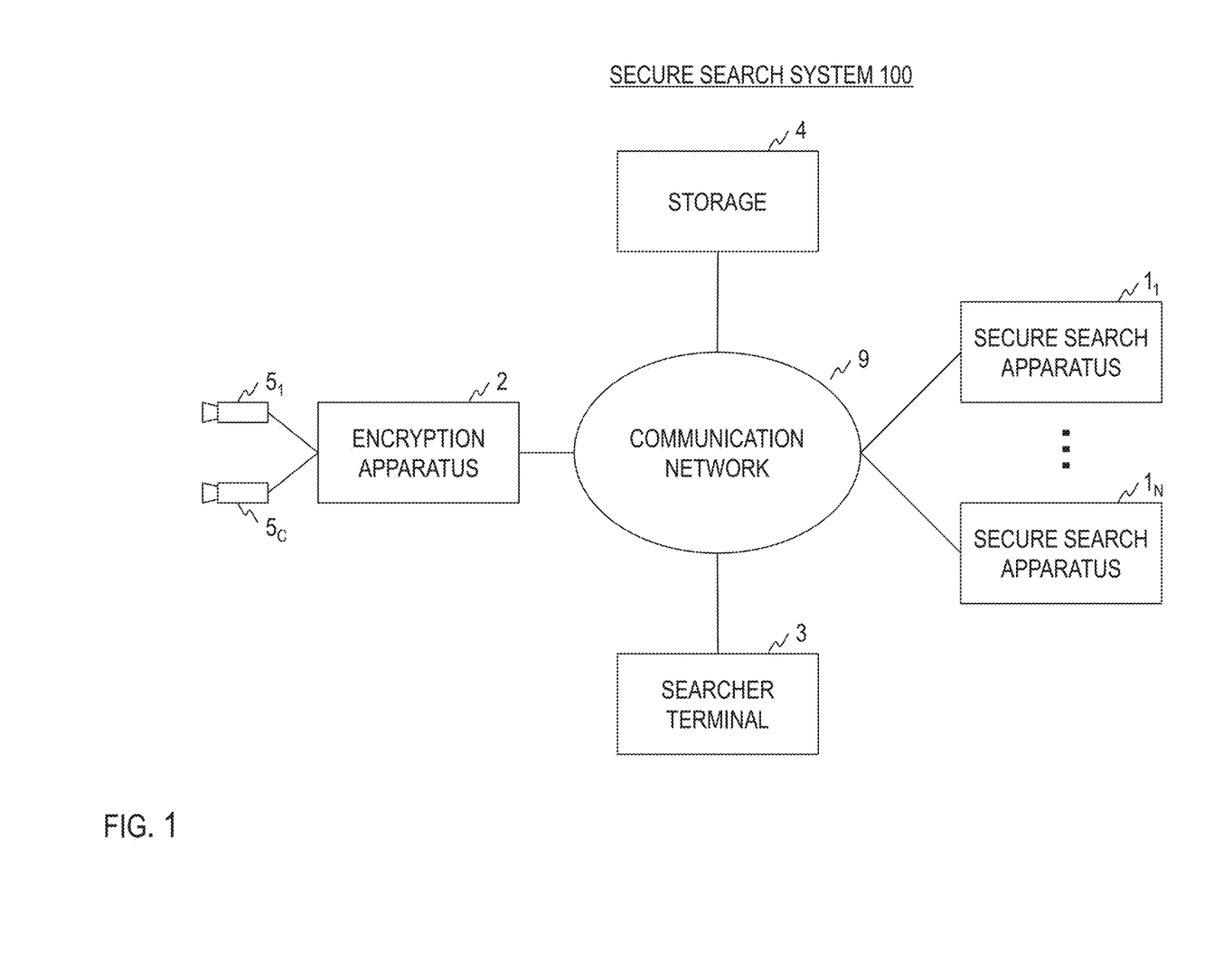
FIG. 1 is a diagram illustrating a functional configuration of a secure search system.

As illustrated in FIG. 1, a secure search system 100 of the embodiment includes N ($\geq 1$) secure search apparatuses $1_1, \ldots, 1_N$, an encryption apparatus 2, a searcher terminal 3, and a storage 4. A plurality of encryption apparatuses 2 and a plurality of searcher terminals 3 may be included. To the encryption apparatus 2, C ($\geq 1$) surveillance cameras $5_1, \ldots, 5c$ are connected by a wired or wireless interface. When a plurality of encryption apparatuses 2 are included, the number C of surveillance cameras $5_c$ ($c \in =1, \ldots, C$) connected to each encryption apparatus 2 may be different from each other. The storage 4 can be omitted by implementing its function in any one of the secure search apparatuses $1_1, \ldots, 1_N$.

Each of the secure search apparatuses $1_1, \ldots, 1_N$, the encryption apparatus 2, the searcher terminal 3, and the storage 4 is connected to a communication network 9. The communication network 9 is a circuit-switching or packet-switching communication network configured such that the connected apparatuses can communicate each other, and for example, the Internet, a local area network (LAN), a wide area network (WAN), or the like can be used.

In case there are a plurality of secure search apparatuses $1_n$ ($n \in \{1, \ldots, N\}$) (that is, when $N \geq 2$), the secure search apparatus $1_n$ performs a search in cooperation with another secure search apparatus $1_{n'}$ ($n' \in \{1, \ldots, N\}$ and $n \neq n'$) using a secure computation method based on secret sharing such as Shamir's Secret Sharing or replicated secret sharing. In case there is one secure search apparatus $1_n$ (that is, when N=1), the secure search apparatus $1_n$ performs a search using a secure computation method based on encryption such as homomorphic encryption.

Figure 2:
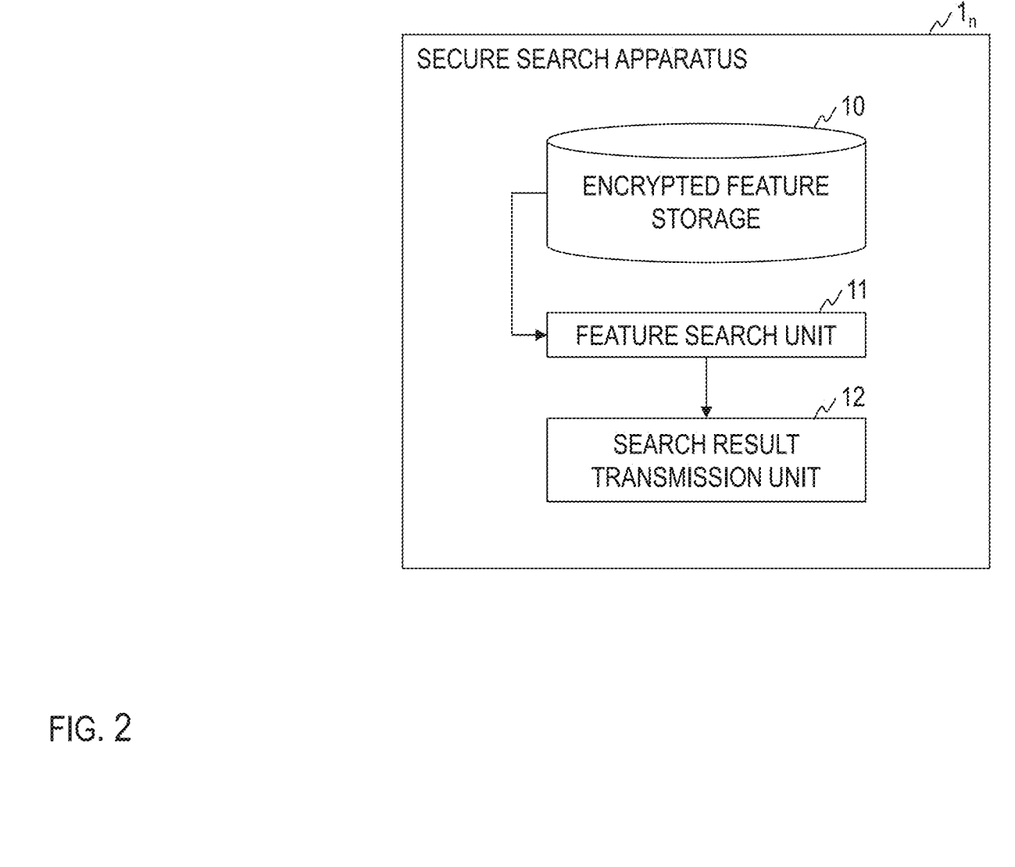
FIG. 2 is a diagram illustrating a functional configuration of a secure search apparatus.
Figure 3:
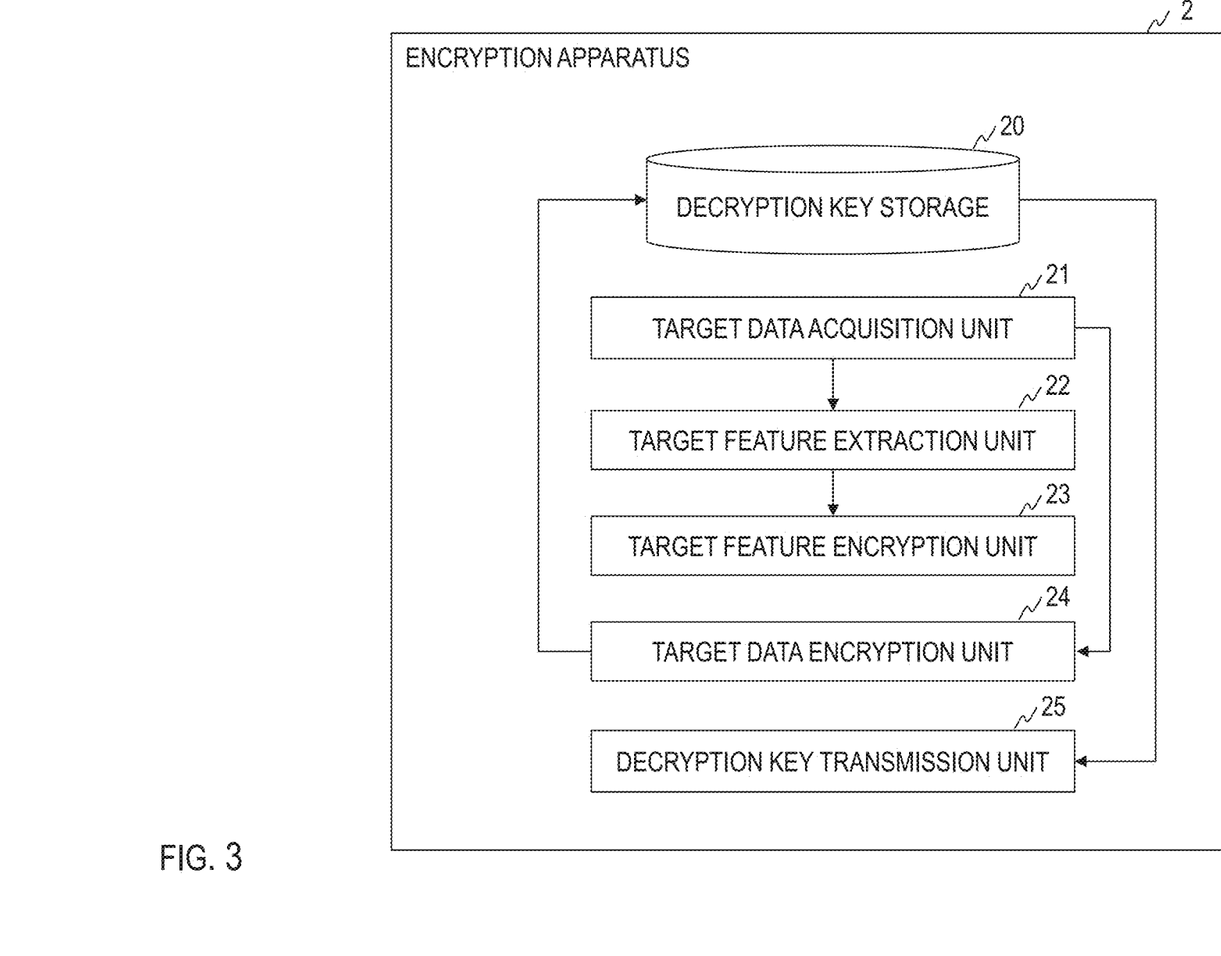
FIG. 3 is a diagram illustrating a functional configuration of an encryption apparatus.
Figure 4:
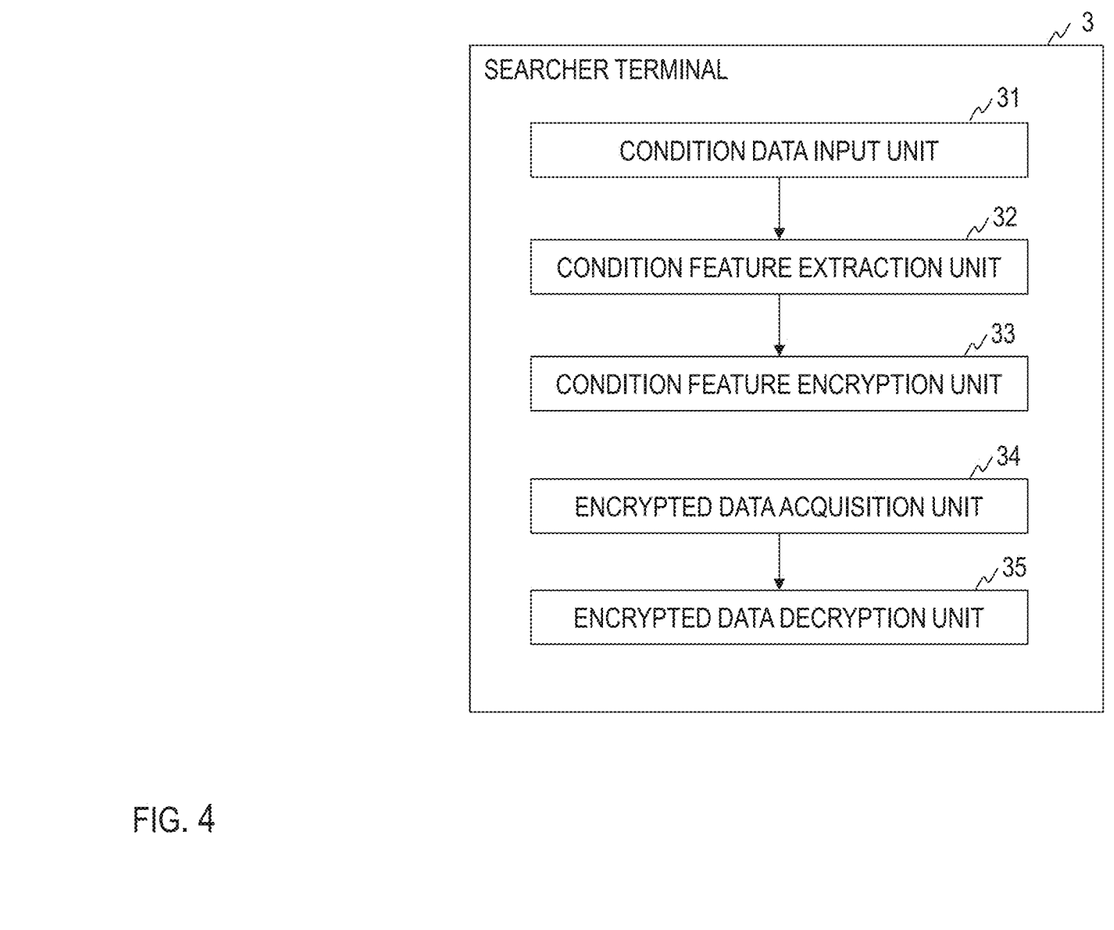
FIG. 4 is a diagram illustrating a functional configuration of a searcher terminal.

For example, as illustrated in FIG. 2, the secure search apparatus $1_n$ (n=1, ..., N) includes an encrypted feature storage 10, a feature search unit 11, and a search result transmission unit 12. For example, as illustrated in FIG. 3, the encryption apparatus 2 includes a decryption key storage 20, a target data acquisition unit 21, a target feature extraction unit 22, a target feature encryption unit 23, a target data encryption unit 24, and a decryption key transmission unit 25. For example, as illustrated in FIG. 4, the searcher terminal 3 includes a condition data input unit 31, a condition feature extraction unit 32, a condition feature encryption unit 33, an encrypted data acquisition unit 34, and an encrypted data decryption unit 35.

Figure 5:
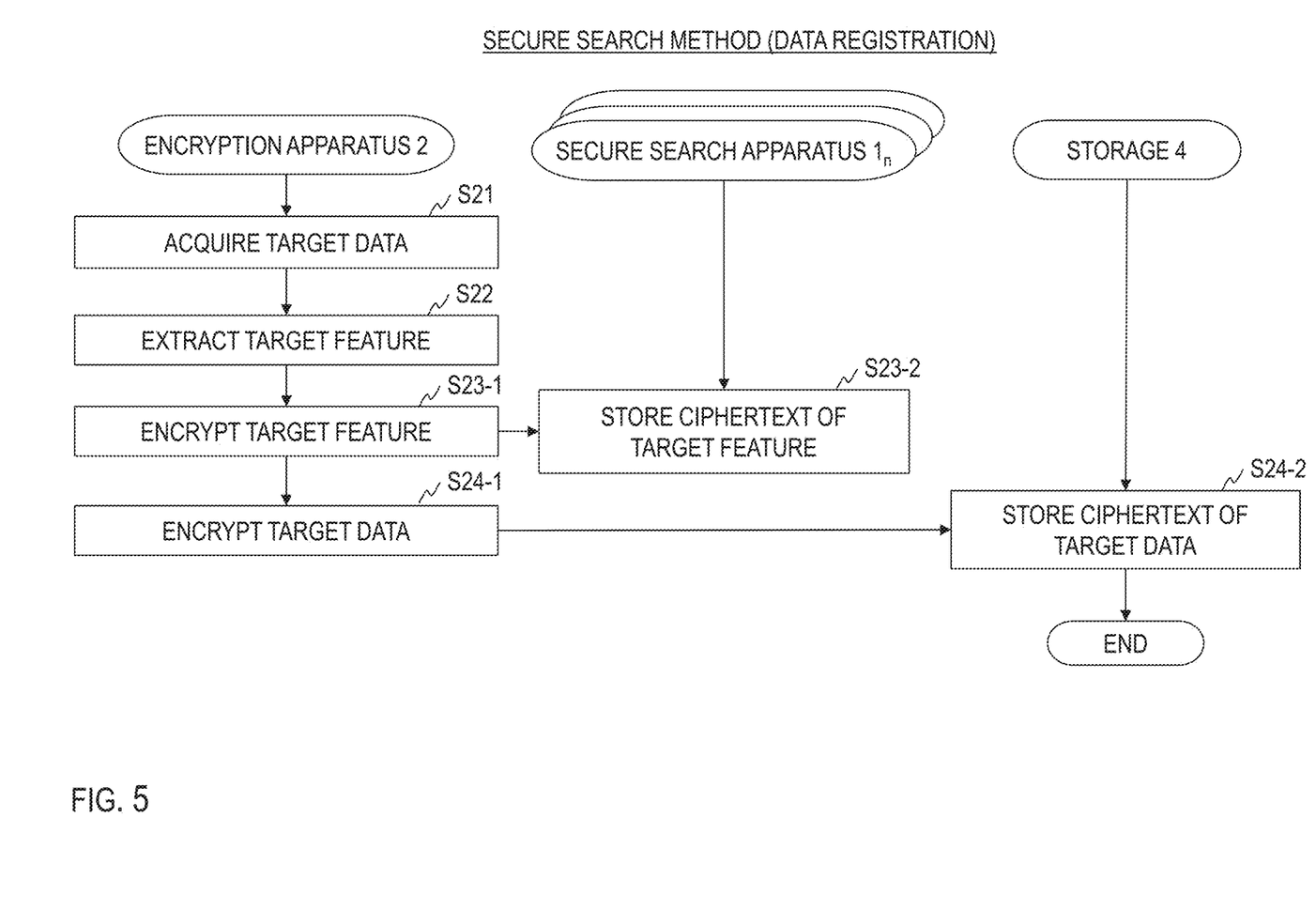
FIG. 5 is a diagram illustrating a processing procedure of a secure search method (data registration).
Figure 6:
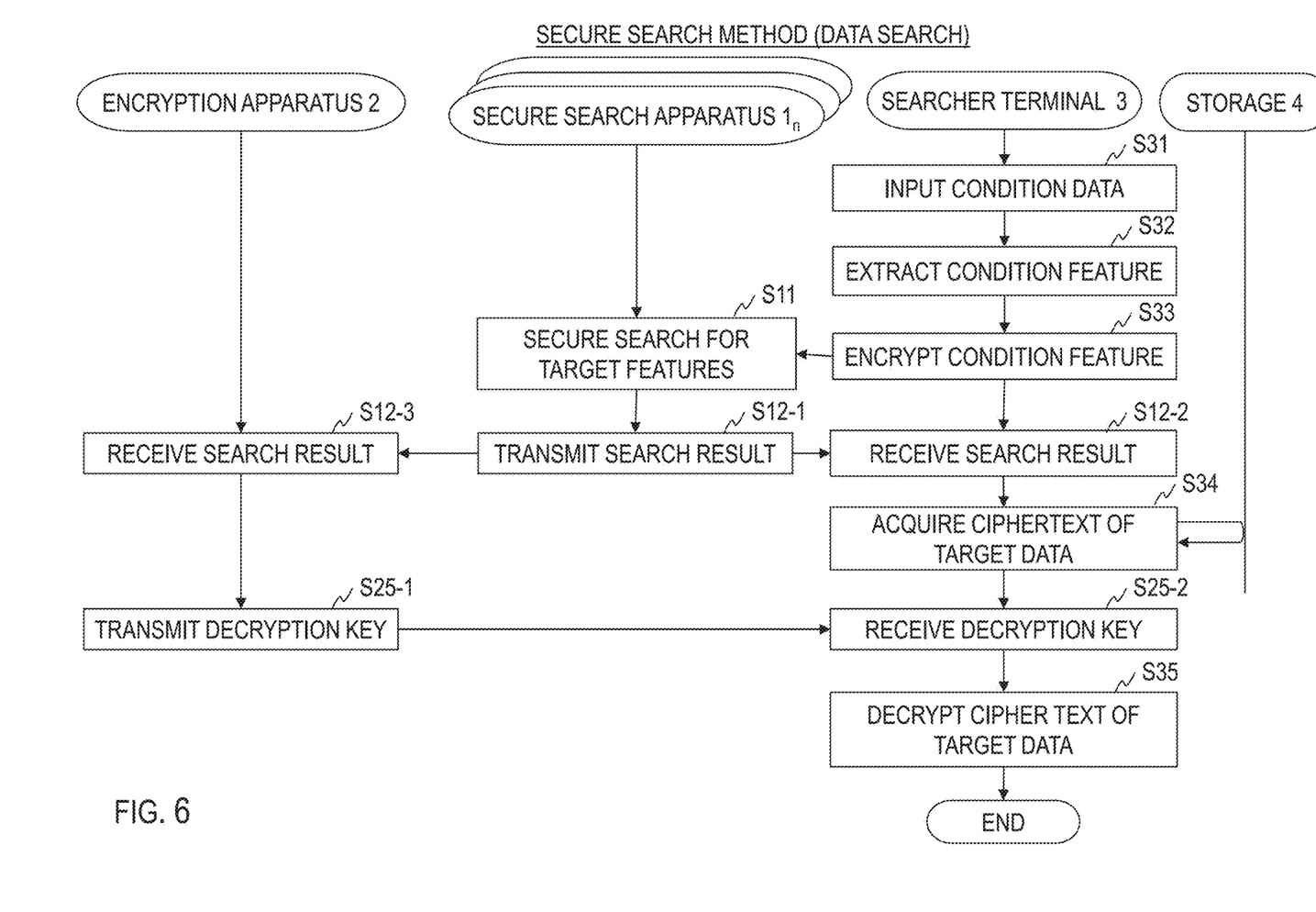
FIG. 6 is a diagram illustrating a processing procedure of a secure search method (data search).

The secure search apparatuses $1_1, \ldots, 1_N$, the encryption apparatus 2, the searcher terminal 3, and the storage 4 included in the secure search system 100 perform the processing of each step illustrated in FIGS. 5 and 6 in cooperation with each other, thereby implementing the secure search method of the embodiment. The secure search method of the embodiment includes two stages, data registration processing where search target data is registered in the secure search system 100, and data search processing where a data similar to the search condition data is searched from search target data by secure computation. FIG. 5 is a flowchart illustrating a procedure of data registration processing, and FIG. 6 is a flowchart illustrating a procedure of data search processing.

Each apparatus or terminal included in the secure search system 100 is a special apparatus configured such that a special program is read by a known or dedicated computer including, for example, a central processing unit (CPU), a main storage (random access memory (RAM)), and the like. For example, each apparatus or terminal executes each processing under a control of the central processing unit. The data which is input to each apparatus or terminal or the data obtained by each processing is stored in, for example, the main storage. The data stored in the main storage is read to the central processing unit, and is used for another processing as necessary. At least some of processing units of each apparatus or terminal may be configured by hardware such as an integrated circuit. Each storage included in each apparatus or terminal may include, for example, a main storage such as a random access memory (RAM), an auxiliary storage including a hard disk, an optical disc, or a semiconductor memory element such as a flash memory, or middleware such as a relational database or a key value store.

The secure search apparatus $1_n$ and the encryption apparatus 2 are, to be specific, information processing devices having a data communication function such as a tower type or rack mount type server computer. The searcher terminal 3 is, to be specific, an information processing apparatus having a data communication function such as a desktop or laptop personal computer, or a mobile terminal such as a smartphone or a tablet. The storage 4 is, to be specific, an information processing apparatus having a data communication function and a data storage function such as a tower type or rack mount type server computer to which a mass storage is connected or a network connected storage incorporating a mass storage.

The surveillance camera $5_c$ is, for example, an imaging apparatus including a video camera that captures a moving image of a person or an object as a subject. There are no limitations on functions that the surveillance camera $5_c$ should have, such as available resolutions, a recording medium for a video, with or without a microphone, and digital recording or analog recording. In general, any imaging apparatus can be used as long as the imaging apparatus can capture a moving image.

A processing procedure at the time of data registration in the secure search method performed by the secure search system 100 according to the embodiment will be described with reference to FIG. 5.

In step S21, the target data acquisition unit 21 of the encryption apparatus 2 acquires data to be searched (hereinafter, referred to as "target data"). The target data is, for example, image data included in the surveillance camera video captured by the surveillance camera $5_c$. At this time, information such as a capturing place and a capturing date and time may be tagged to the target data. The target data acquisition unit 21 outputs the acquired target data to the target feature extraction unit 22 and the target data encryption unit 24.

In step S22, the target feature extraction unit 22 of the encryption apparatus 2 receives the target data from the target data acquisition unit 21 and extracts a feature (hereinafter, referred to as "target feature") from the target data. The target feature extraction unit 22 outputs the extracted target feature to the target feature encryption unit 23.

The method of extracting the feature can be arbitrarily determined according to the type of the target data. For example, in case such a use scene is assumed as the target data is image data included in a video in which an unspecified number of people are captured, and a face of a specific person is searched for from the target data, the feature may be extracted in the following two steps. First, regions to be searched (for example, the faces of humans) are extracted from image data captured by the surveillance camera $5_c$ (step 1). For the region extraction, for example, a general method such as principal component analysis may be used (see Reference Document 1). Next, the extracted face image data are converted into features (step 2). In the feature conversion of the face image data, for example, the pixel value of each pixel of the image may be adopted as it is as the feature, or the change of each pixel may be adopted as the feature using a general edge extraction method (see Reference Document 2).

[Reference Document 1] Mante Opel, "Facial recognition using principal component analysis", [online], [retrieved on Mar. 9, 2020], Internet <URL: https://qiita.com/manteopel/items/703e9946e1903c6e2aa3>

[Reference Document 2] SUNSHINE, "Feature" of "image recognition" (2): Summarized are What is "edge detection"? What kind of mechanism? What is a "spatial filter"? How is it used?", [online], [retrieved on Mar. 9, 2020], Internet <URL: https://it-mint.com/2018/11/05/feature-value-in-image-recognition-whats-edge-detection-and-spatial-filter-1839.html>

In case the target data is voice data, a known acoustic feature may be extracted. In case the target data is text data, a feature such as a known word embedding vector may be extracted.

In step S23-1, the target feature encryption unit 23 of the encryption apparatus 2 receives the target feature from the target feature extraction unit 22 and encrypts the target feature. The target feature encryption unit 23 encrypts the target feature using any encryption method or secret sharing method capable of secure computation. Specifically, examples of the encryption method capable of secure computation include homomorphic encryption, and examples of the secret sharing method capable of secure computation include Shamir's Secret Sharing and replicated secret sharing. The generated ciphertext is one ciphertext in the case of the encryption method, and are split values consisting of a plurality of shares in the case of the secret sharing method. The target feature encryption unit 23 transmits the ciphertext of the target feature to each secure search apparatus $1_n$. Here, "transmitting the ciphertext to each secure search apparatus $1_n$" means transmitting one ciphertext to one secure search apparatus $1_1$ if the ciphertext is in an encryption method, and distributing the split values so that each of the plurality of secure search apparatuses $1_1, \ldots, 1_N$ holds one share without overlapping if the ciphertext is in a secret sharing method. The same applies to the following description.

In step S23-2, each secure search apparatus $1_n$ receives the ciphertext of the target feature from the encryption apparatus 2 and stores the ciphertext of the target feature in the encrypted feature storage 10.

In step S24-1, the target data encryption unit 24 of the encryption apparatus 2 receives the target data from the target data acquisition unit 21 and encrypts the target data. The encryption method used by the target data encryption unit 24 is an encryption method different from the encryption method used by the target feature encryption unit 23, and is an encryption method in which original data cannot be obtained unless a valid decryption key is used. Such an encryption method may be common key encryption or public key encryption. The target data encryption unit 24 associates information indicating the ciphertext of the target data with information indicating a decryption key necessary for decrypting the ciphertext of the target data, and stores the information in the decryption key storage 20. The information indicating the decryption key may be the decryption key itself or may be information that can identify the decryption key exchanged in advance between the encryption apparatus 2 and the searcher terminal 3 by a secure method. The target data encryption unit 24 transmits the ciphertext of the target data to the storage 4.

In step S24-2, the storage 4 receives the ciphertext of the target data from the encryption apparatus 2 and stores the ciphertext of the target data.

A processing procedure at the time of data search in the secure search method performed by the secure search system 100 according to the embodiment will be described with reference to FIG. 6.

In step S31, the condition data input unit 31 of the searcher terminal 3 acquires data (hereinafter, referred to as "condition data") as a search condition input to the searcher terminal 3 by the searcher using the searcher terminal 3. The condition data is, for example, image data in which a face of a person to be searched is captured. The condition data input unit 31 outputs the acquired condition data to the condition feature extraction unit 32.

In step S32, the condition feature extraction unit 32 of the searcher terminal 3 receives condition data from the condition data input unit 31 and extracts a feature (hereinafter, referred to as a "condition feature") from the condition data. The feature extracted by the condition feature extraction unit 32 is similar to the feature extracted by the target feature extraction unit 22 of the encryption apparatus 2. The condition feature extraction unit 32 outputs the extracted condition feature to the condition feature encryption unit 33.

In step S33, the condition feature encryption unit 33 of the searcher terminal 3 receives the condition feature from the condition feature extraction unit 32 and encrypts the condition feature. The encryption method used by the condition feature encryption unit 33 is similar to the encryption method used by the target feature encryption unit 23 of the encryption apparatus 2. The condition feature encryption unit 33 transmits the ciphertext of the condition feature to each secure search apparatus $1_n$.

In step S11, the feature search unit 11 of each secure search apparatus $1_n$ receives the ciphertext of the condition feature from the searcher terminal 3, and searches for the target feature similar to the condition feature by secure computation using the ciphertext of the target feature stored in the encrypted feature storage 10 and the ciphertext of the condition feature received from the searcher terminal 3. That is, the ciphertext of the target feature similar to the condition feature is extracted while keeping the target feature and the condition feature secret. The feature search unit 11 outputs information (hereinafter, referred to as a "search result") indicating the ciphertext of the target data corresponding to the extracted ciphertext of the target feature to the search result transmission unit 12.

The feature search by the secure computation can be performed by calculating Euclidean distances between the condition data and all the target data and comparing the calculation result with a predetermined threshold using secure computation. The Euclidean distance is calculated as follows. It is assumed that the data to be searched (target data) and the search data (condition data) are image data of n×m pixels. When the pixel values of the search data (feature) are x=[$x_{ij}$] and the pixel values of the search data are y=[$y_{ij}$] (i=1, ..., m, j=1, ..., n), the Euclidean distance D is expressed by the following formula (see Reference Document 3).

$$D = \sqrt{\sum_{i=1}^{m}\sum_{j=1}^{n}(x_{ij} - y_{ij})}$$ [Math. 1]

[Reference Document 3] Kohei Inoue, Kiichi Urahama, "Filtering Method for Image Retrieval Based on Lower Bound of Euclidean Distance", Journal of The Institute of Image Information and Television Engineers, Vol. 59, No. 11, pp. 1701-1704, 2005

The secure computation of the Euclidean distance D can be easily achieved by utilizing secure computation having the additive homomorphism.

A search result can be generated by calculating the Euclidean distance D for all target data and comparing the calculation result with a predetermined threshold. For example, target data whose Euclidean distance D are equal to or less than a predetermined threshold, or a predetermined number of pieces of target data from the head when the Euclidean distance D is sorted in ascending order may be output as the search result. For the sort computation on the secure computation, for example, the method described in Reference Document 4 can be used.

[Reference Document 4] Dai Ikarashi, Koki Hamada, Ryo Kikuchi, Koji Chida, "A Design and an Implementation of Super-High-Speed Multi-Party Sorting: The Day When Multi-Party Computation Reaches Scripting Languages", Computer Security Symposium (CSS), 2017

In step S12-1, the search result transmission unit 12 of each secure search apparatus $1_n$ receives the search result from the feature search unit 11 and transmits the search result to the searcher terminal 3. In addition, the search result transmission unit 12 transmits the search result and information indicating the searcher terminal 3 to the encryption apparatus 2.

In step S12-2, the searcher terminal 3 receives the search result from each secure search apparatus $1_n$ and obtains information indicating the ciphertext of the target data from the search result. In case the feature search unit 11 performs a search by a secure computation method based on secret sharing, information indicating the ciphertext of the target data may be obtained by restoring the share of the search result received from each secure search apparatus $1_n$. In case the feature search unit 11 performs a search by a secure computation method based on encryption, information indicating the ciphertext of the target data may be obtained by decrypting the search result received from the secure search apparatus $1_1$ according to a predetermined decryption method. The searcher terminal 3 inputs obtained information indicating the ciphertext of the target data to the encrypted data acquisition unit 34.

In step S12-3, the encryption apparatus 2 receives the search result and the information indicating the searcher terminal 3 from each secure search apparatus $1_n$, and obtains information indicating the ciphertext of the target data from the search result, similarly to the searcher terminal 3. The encryption apparatus 2 inputs obtained information indicating the ciphertext of the target data and information indicating the searcher terminal 3 to the decryption key transmission unit 25.

In step S34, the encrypted data acquisition unit 34 of the searcher terminal 3 acquires the ciphertext of the target data indicated by the input information from the storage 4. The encrypted data acquisition unit 34 outputs the acquired ciphertext of the target data to the encrypted data decryption unit 35.

In step S25-1, the decryption key transmission unit 25 of the encryption apparatus 2 acquires, from the decryption key storage 20, information indicating a decryption key for decrypting the ciphertext of the target data indicated by the input information. The decryption key transmission unit 25 transmits acquired information indicating the decryption key to the searcher terminal 3.

In step S25-2, the searcher terminal 3 receives information indicating a decryption key from the encryption apparatus 2 and acquires the decryption key. The searcher terminal 3 inputs the acquired decryption key to the encrypted data decryption unit 35.

In step S35, the encrypted data decryption unit 35 of the searcher terminal 3 receives the ciphertext of the target data from the encrypted data acquisition unit 34, and decrypts the ciphertext of the target data using the input decryption key. The encrypted data decryption unit 35 outputs the original target data obtained by decryption. In case the target data acquisition unit 21 has tagged information such as a capturing place and a capturing date and time to the target data, such information may be added to the output target data.

With the above configuration, the secure search apparatuses $1_1$, ..., and $1_N$ search the target data using only the feature, so that the computation cost of the data search by the secure computation can be reduced. In addition, the searcher terminal 3 can acquire, as the search result, original data itself that is similar to the search condition data among the pieces of target data. Here, since the original data is encrypted by an encryption method that cannot be decrypted without a decryption key, information regarding the original data is not leaked to the secure search apparatuses $1_1$, ..., $1_N$. Therefore, the original data can be safely provided to the searcher terminal as the search result.

Modification

In the secure search system of the embodiment, the encryption apparatus 2 extracts a feature from each of image data captured by the plurality of surveillance cameras $5_1$, ..., $5_c$, encrypts the feature and the original image data, and stores the encrypted feature and the original image data so as to be usable from the secure computation apparatuses $1_1$, ..., $1_N$. However, the encryption apparatus 2 can be omitted by implementing the feature extraction and encryption functions in the surveillance cameras $5_1$, ..., $5_c$ themselves. In this case, the surveillance cameras $5_1$, ..., $5_c$ include the decryption key storage 20, the target feature extraction unit 22, the target feature encryption unit 23, the target data encryption unit 24, and the decryption key transmission unit 25 included in the encryption apparatus 2 of the embodiment. That is, in the secure search system of the modification, each of the surveillance cameras $5_1$, ..., $5_c$ is configured to correspond to the encryption apparatus 2.

While the embodiment of the present invention has been described above, a specific configuration is not limited to the embodiment, and it goes without saying that an appropriate design change or the like not departing from the gist of the present invention is included in the present invention. The various processes described in the embodiments may be executed not only in chronological order according to the described order, but also in parallel or individually according to the processing capability of an apparatus that executes the processes or as needed.

[Program and Recording Medium]

In case various types of processing functions in each apparatus described in the embodiment are implemented by a computer, processing content of the functions of each apparatus is described by a program. By causing a memory 1020 of a computer illustrated in FIG. 7 to read this program and causing a calculation unit 1010, an input unit 1030, an output unit 1040, and the like to execute the program, various kinds of processing functions in each of the foregoing devices are implemented on the computer.

The program describing the processing content may be recorded on a computer-readable recording medium. The computer-readable recording medium is, for example, a non-transitory recording medium, and is a magnetic recording apparatus, an optical disc, or the like.

Distribution of the program is performed by, for example, selling, transferring, or renting a portable recording medium such as a DVD or a CD-ROM on which the program is recorded. Further, a configuration in which the program is stored in a storage in a server computer and the program is distributed by transferring the program from the server computer to other computers via a network may also be employed.

Figure 7:
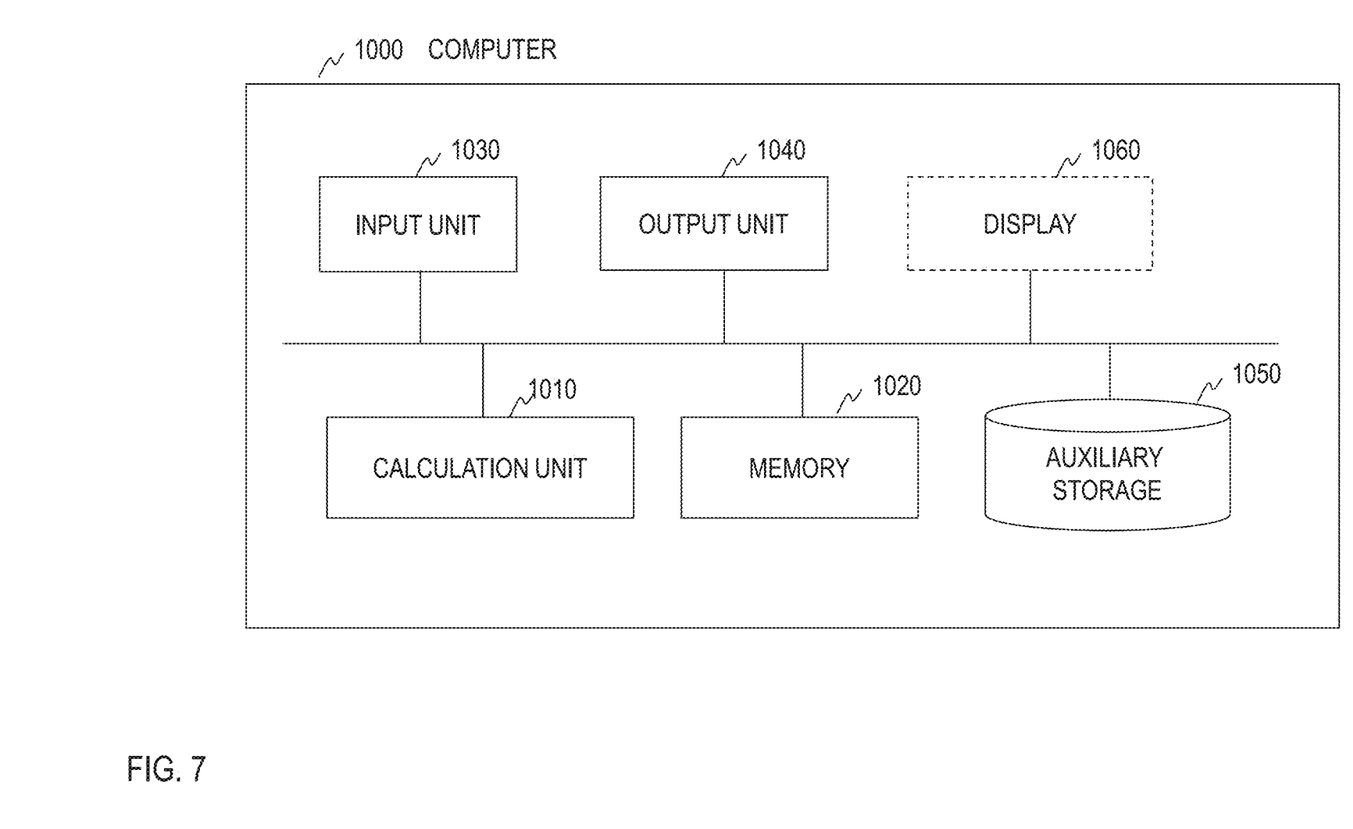
FIG. 7 is a diagram illustrating a functional configuration of a computer.

For example, the computer that executes such a program first temporarily stores the program recorded in a portable recording medium or the program transferred from the server computer in an auxiliary storage 1050 that is a non-transitory storage device of the computer. In addition, when executing processing, the computer reads the program stored in the auxiliary storage 1050 that is a non-transitory storage device of the computer, into the memory 1020 that is a temporary storage device, and executes processing according to the read program. Further, as another embodiment of the program, a computer may directly read the program from a portable recording medium and execute processing according to the program, and a computer may sequentially execute processing according to the received program each time the program is transferred from a server computer to the computer. Further, the above-described processing may be executed by a so-called application service provider (ASP) type service that implements a processing function only by an execution instruction and result acquisition without transferring the program from the server computer to the computer. The program according to the present embodiment includes information used for a process by an electronic computer and equivalent to the program (data or the like that is not a direct command to the computer but has a property that defines a process of the computer).

Although the various apparatuses described in the embodiment are configured by executing a predetermined program on a computer in the description above, at least part of the processing content may be implemented by hardware.

The invention claimed is:

1. A secure search method performed by a secure search system including at least one secure search apparatus, an encryption apparatus, and a searcher terminal, the secure search method comprising:

encrypting target features extracted from target data that are a search target, by a target feature encryption circuitry of the encryption apparatus;

storing the encrypted target features in the secure search apparatus;

encrypting the target data by a target data encryption circuitry of the encryption apparatus;

encrypting a condition feature extracted from condition data that is a search condition, by a condition feature encryption circuitry of the searcher terminal;

acquiring a search result indicating a ciphertext of the target data corresponding to the target feature similar to the condition feature while keeping the target feature and the condition feature secret using a ciphertext of the target feature and a ciphertext of the condition feature, by a feature search circuitry of the secure search apparatus; and decrypting the ciphertext of the target data indicated by the search result to acquire original target data by an encrypted data decryption circuitry of the searcher terminal, wherein the ciphertext of the target feature and the ciphertext of the condition feature are encrypted by a first encryption method capable of secure computation, the ciphertext of the target data is encrypted by a second encryption method that is different from the first encryption method and requires a decryption key for decryption, a decryption key transmission circuitry of the encryption apparatus transmits information indicating the decryption key for decrypting the ciphertext of the target data indicated by the search result to the searcher terminal, and the encrypted data decryption circuitry decrypts the ciphertext of the target data indicated by the search result using the decryption key.

2. The secure search method according to claim 1, wherein the target data is image data included in a video captured by a surveillance camera, and the condition data is image data in which a face of a specific person is captured.

3. A non-transitory computer-readable recording medium which stores a program for causing a computer to execute each step of the secure search method according to claim 1.

4. A secure search system comprising at least one secure search apparatus, an encryption apparatus, and a searcher terminal, the encryption apparatus including a target feature encryption circuitry that encrypts target features extracted from target data that are a search target, and a target data encryption circuitry that encrypts the target data, the searcher terminal including a condition feature encryption circuitry that encrypts a condition feature extracted from condition data that is a search condition and an encrypted data decryption circuitry that decrypts a ciphertext of the target data indicated by a search result to acquire original target data, the secure search apparatus including a feature search circuitry that acquires a search result indicating the ciphertext of the target data corresponding to the target feature similar to the condition feature while keeping the target feature and the condition feature secret using a ciphertext of the target feature and a ciphertext of the condition feature,
wherein the target features encrypted by the target feature encryption circuitry are stored in the secure search apparatus,
the ciphertext of the target feature and the ciphertext of the condition feature are encrypted by a first encryption method capable of secure computation,
the ciphertext of the target data is encrypted by a second encryption method that is different from the first encryption method and requires a decryption key for decryption,
a decryption key transmission circuitry of the encryption apparatus transmits information indicating the decryption key for decrypting the ciphertext of the target data indicated by the search result to the searcher terminal, and
the encrypted data decryption circuitry decrypts the ciphertext of the target data indicated by the search result using the decryption key.

5. A secure search apparatus used in a secure search system that searches target data for data similar to a condition data, the secure search system including the secure search apparatus, an encryption apparatus, and a searcher terminal, the secure search apparatus comprising:
a feature search circuitry,
wherein a target feature encryption circuitry of the encryption apparatus encrypts target features extracted from target data that are a search target;
the target features encrypted by the target feature encryption circuitry are stored in the secure search apparatus;
a target data encryption circuitry of the encryption apparatus encrypts the target data;
a condition feature encryption circuitry of the searcher terminal encrypts a condition feature extracted from condition data that is a search condition;
the feature search circuitry of the secure search apparatus acquires a search result indicating a ciphertext of the target data corresponding to the target feature similar to the condition feature while keeping the target feature and the condition feature secret using a ciphertext of the target feature and a ciphertext of the condition feature;
an encrypted data decryption circuitry of the searcher terminal decrypts the ciphertext of the target data indicated by the search result to acquire original target data;
the ciphertext of the target feature and the ciphertext of the condition feature are encrypted by a first encryption method capable of secure computation,
the ciphertext of the target data is encrypted by a second encryption method that is different from the first encryption method and requires a decryption key for decryption,
a decryption key transmission circuitry of the encryption apparatus transmits information indicating the decryption key for decrypting the ciphertext of the target data indicated by the search result to the searcher terminal, and
an encrypted data decryption circuitry of the searcher terminal decrypts the ciphertext of the target data indicated by the search result using the decryption key.

6. A encryption apparatus used in a secure search system that searches target data for data similar to a condition data comprising at least a secure search apparatus, the encryption apparatus, and a searcher terminal, the encryption apparatus comprising:
a target feature encryption circuitry;
a target data encryption circuitry; and
a decryption key transmission circuitry,
wherein the target feature encryption circuitry of the encryption apparatus encrypts target features extracted from target data that are a search target;
the target features encrypted by the target feature encryption circuitry are stored in the secure search apparatus;
the target data encryption circuitry of the encryption apparatus encrypts the target data;
a condition feature encryption circuitry of the searcher terminal encrypts a condition feature extracted from condition data that is a search condition;
a feature search circuitry of the secure search apparatus acquires a search result indicating a ciphertext of the target data corresponding to the target feature similar to the condition feature while keeping the target feature and the condition feature secret using a ciphertext of the target feature and a ciphertext of the condition feature;
an encrypted data decryption circuitry of the searcher terminal decrypts the ciphertext of the target data indicated by the search result to acquire original target data;
the ciphertext of the target feature and the ciphertext of the condition feature are encrypted by a first encryption method capable of secure computation,
the ciphertext of the target data is encrypted by a second encryption method that is different from the first encryption method and requires a decryption key for decryption,
the decryption key transmission circuitry of the encryption apparatus transmits information indicating the decryption key for decrypting the ciphertext of the target data indicated by the search result to the searcher terminal, and
an encrypted data decryption circuitry of the searcher terminal decrypts the ciphertext of the target data indicated by the search result using the decryption key.

7. A searcher terminal used in the secure search system that searches target data for data similar to a condition data comprising at least a secure search apparatus, an encryption apparatus, and the searcher terminal, the searcher terminal comprising:
a condition feature encryption circuitry; and
an encrypted data decryption circuitry,
wherein a target feature encryption circuitry of the encryption apparatus encrypts target features extracted from target data that are a search target;
a target features encrypted by the target feature encryption circuitry are stored in the secure search apparatus;
a target data encryption circuitry of the encryption apparatus encrypts the target data;
the condition feature encryption circuitry of the searcher terminal encrypts a condition feature extracted from condition data that is a search condition;
a feature search circuitry of the secure search apparatus acquires a search result indicating a ciphertext of the target data corresponding to the target feature similar to the condition feature while keeping the target feature and the condition feature secret using a ciphertext of the target feature and a ciphertext of the condition feature;

the encrypted data decryption circuitry of the searcher terminal decrypts the ciphertext of the target data indicated by the search result to acquire original target data;

the ciphertext of the target feature and the ciphertext of the condition feature are encrypted by a first encryption method capable of secure computation, the ciphertext of the target data is encrypted by a second encryption method that is different from the first encryption method and requires a decryption key for decryption, a decryption key transmission circuitry of the encryption apparatus transmits information indicating the decryption key for decrypting the ciphertext of the target data indicated by the search result to the searcher terminal, and the encrypted data decryption circuitry of the searcher terminal decrypts the ciphertext of the target data indicated by the search result using the decryption key.

* * * * *